UNITED STATES PATENT OFFICE.

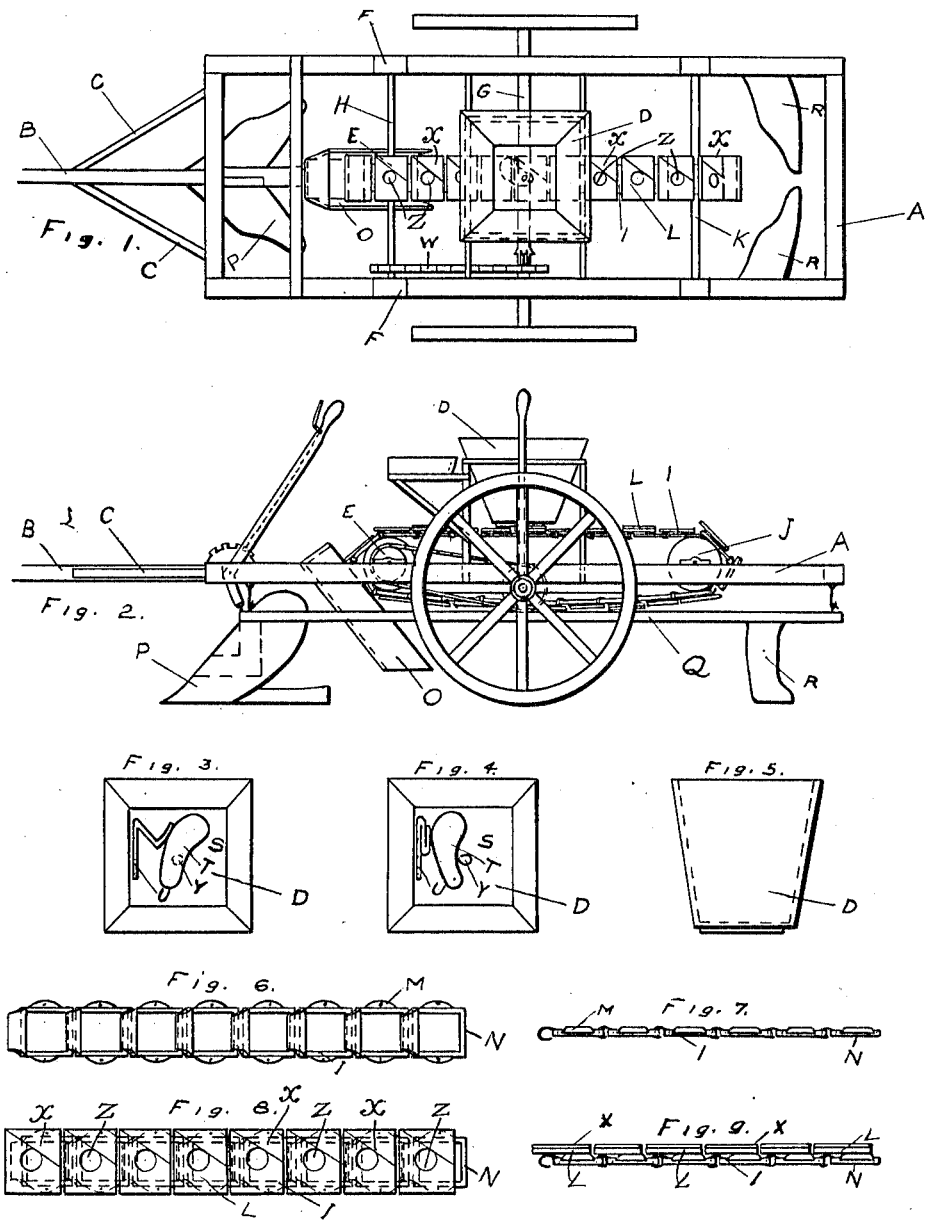

FELIX VOJCIHOSKI, OF MENOMINEE TOWNSHIP, MENOMINEE COUNTY, MICHIGAN.

ENDLESS-CHAIN SEEDER AND PLANTER.

1,084,768.

Specification of Letters Patent.  Patented Jan. 20, 1914.

Application filed December 23, 1911.  Serial No. 667,563.

*To all whom it may concern:*

Be it known that I, FELIX VOJCIHOSKI, a citizen of the United States, residing in Menominee township, in the county of Menominee and State of Michigan, have invented a new and useful Endless-Chain Seeder and Planter, of which the following is a specification.

My invention relates to improvements in endless chain seeders and planters and the objects of my invention are the construction of a machine that is provided with an endless chain seed slide to drop the contents of the hopper and to break the ground and plant the seed by the same operation; and second, to provide means of a rapid and economical planting. I attain these objects by the mechanism illustrated in the accompanying drawing, in which—

Figure 1, is a top view of the entire device; Fig. 2 is a side view of the same; Fig. 3, is a bottom view of the hopper showing the movable plate closed; Fig. 4, is a similar view showing the movable plate open; Fig. 5, is a side elevation; Fig. 6, is a top view of the endless chain without the blocks; Fig. 7, is a side view of the same; Fig. 8, is a top view of the endless chain with the blocks attached and Fig. 9, is a side view of the same.

Similar letters refer to similar parts throughout the several views.

The frame A, is carried by a sulky-axle and wheels and has attached a tongue B, made rigid by braces C C, extending from its sides one to each front corner of the frame A. The frame A carries a hopper D, in front of which there is shaft H having a sprocket wheel in the center of its length and extending transversely across the device to two bearings F F, situated on the upper side of the frame A. A similar shaft K, carrying a sprocket-wheel J, extends transversely across the rear portion of the frame. An endless chain W is sprocketed from the axle G, to the shaft H. An endless chain I, passes over the sprocket wheel E, and the sprocket wheel J. This chain carries detachable blocks L, having longitudinal grooves or recesses Z for holding seeds of smaller kinds. These blocks are attachable to the chain by screws to be passed through the screw holes on the flanges M, on both sides of the several links N of the chain. This chain passes under the hopper D, and over the front of the sprocket E, dropping the seeds into a trough or path O, whence they are carried to the ground behind the plow P, (which is attached by rods Q Q, to the front and inside of the frame) and are covered with earth by coverers R R, attached to the plow frame. At the bottom the hopper D, has a movable plate S, having an opening in its center which is covered from beneath by a pivoted cut-off plate T. As the chain passes under the hopper D, the wedge shaped projection X, on each of the blocks L pushes the cut-off plate T, from the hole in the movable plate, S, releasing the seeds whence they drop into the recesses in the blocks L. After the wedge shaped projection passes from under the hopper the cut-off plate T, is forced by a spring U, to a position which shuts off the supply from the hopper D.

The bottom of the hopper D, is detachable and when the device is used for planting potatoes, the said bottom is removed and such blocks as may not be desired are detached from the chain allowing the seeds (prepared potatoes) to drop from the hopper D, down on the chain N, whence they are carried to the trough O, and deposited behind the plow P, and are covered with earth with the coverers R R.

Having thus described my invention, what I claim as new and desire to secure by Letters Patent is as follows:—

The combination in a planter, of a hopper provided with a discharge opening controlled by a cut-off spring pressed to close the said opening, and an endless chain of seed carrying members having projections adapted to actuate the said cut-off and to permit a discharge of seed into the members.

FELIX VOJCIHOSKI.

Witnesses:
HENRY DELGOFF,
PEDER JENSEN.

---

Copies of this patent may be obtained for five cents each, by addressing the "Commissioner of Patents, Washington, D. C."